(12) United States Patent
Lee

(10) Patent No.: US 7,203,295 B2
(45) Date of Patent: Apr. 10, 2007

(54) VIRTUAL TELECOMMUNICATION MESSAGING SERVICE SYSTEM AND METHOD

(76) Inventor: Raymond Wei Man Lee, 5F, No. 175-1 Chien-Kang Rd., Taipei (TW)

( * ) Notice: Subject to any disclaimer, the term of this patent is extended or adjusted under 35 U.S.C. 154(b) by 634 days.

(21) Appl. No.: 10/354,022

(22) Filed: Jan. 30, 2003

(65) Prior Publication Data
US 2004/0151288 A1   Aug. 5, 2004

(51) Int. Cl.
*H04M 1/56* (2006.01)
(52) U.S. Cl. ............... 379/142.09; 379/142.01
(58) Field of Classification Search .......... 379/142.01, 379/142.02, 142.06, 142.09, 201.01
See application file for complete search history.

(56) References Cited

U.S. PATENT DOCUMENTS 5,590,184 A * 12/1996 London ............... 379/142.09
5,832,072 A * 11/1998 Rozenblit ............ 379/246
6,163,606 A * 12/2000 Otto .................... 379/211.02
6,343,120 B1 * 1/2002 Rhodes ................ 379/142.01

* cited by examiner

*Primary Examiner*—Bing Q. Bui
(74) *Attorney, Agent, or Firm*—Bacon & Thomas, PLLC

(57) ABSTRACT

This invention relates a system, wherein virtual numbers are provided to users through Telecom or computer networks, and one-way or two-way message transmission (texts, images, music or multimedia) are achieved under the situation that message senders do not know the true call numbers of receivers. Virtual numbers are used by receivers permanently for acceptance of messages. According to the setting of users, the message senders are required to input password, thus the service is only offered to specific senders. In addition, the time for message acceptance can be set. The system can integrate accounts and message management for users.

20 Claims, 2 Drawing Sheets

VIRTUAL TELECOMMUNICATION MESSAGING SERVICE SYSTEM AND METHOD

BACKGROUND OF THE INVENTION

1. Field of the Invention

This invention relates to a computer telecommunication system, more specifically, a virtual telecommunication messaging service system. Through this system, a user gets a virtual number, and inputs his mobile phone number or other call numbers into this system. The user receives messages with this virtual number, which is used permanently. If the user changes his mobile phone number later, only the system is needed to be updated.

2. Description of the Prior Art

Mobile telephone, as a convenient way of communication, is increasingly popular in the world. While growing problems relative to privacy of receivers and opportune moment of communication are emerging. For instance, receivers often disclose their mobile phone numbers involuntarily (business relation for example), while it is possible for them to be called at any time without being warned (during meetings, private time, or in foreign countries on business). On the other hand, languages are not always more convenient than text, for instance, short messages may help one to know the forgotten addresses without writing them down. Quite a few enterprises and groups communicate through mobile phones, which result in many problems. For instance, the name list of news reporters must be updated often in order to be contacted correctly. If virtual numbers that are independent of users are applied, the mobile call numbers of reporters shall be updated automatically by media, and enterprises or groups could keep communication with right media reporters at any moment without worrying about the maintenance and validity of data. Of course, these are more such cases, and it is quite important to develop more functions out of mobile phones.

SUMMARY OF THE INVENTION

An objective of the present invention is to provide a virtual telecommunication messaging service system, a user (receiver) inputs telecommunication equipment data into this system firstly, and gets one or more virtual numbers. The receiver can set a password for his virtual number, and a message sender can only send messages with the password, which is offered to the sender by the receiver, and then the sender can contact the receiver by the virtual number through this system.

Another objective of the present invention is to provide a virtual telecommunication messaging service system, which is used for group management, timing transmission, and accounts integration management and message subscription. A user (receiver) may integrate this system with Emails for data backup. A message sender may leave his call numbers directly by the system, and receiver can answer back through mobile phones directly for two-way communication

DESCRIPTION OF THE PREFERRED EMBODIMENT

Figure 1:
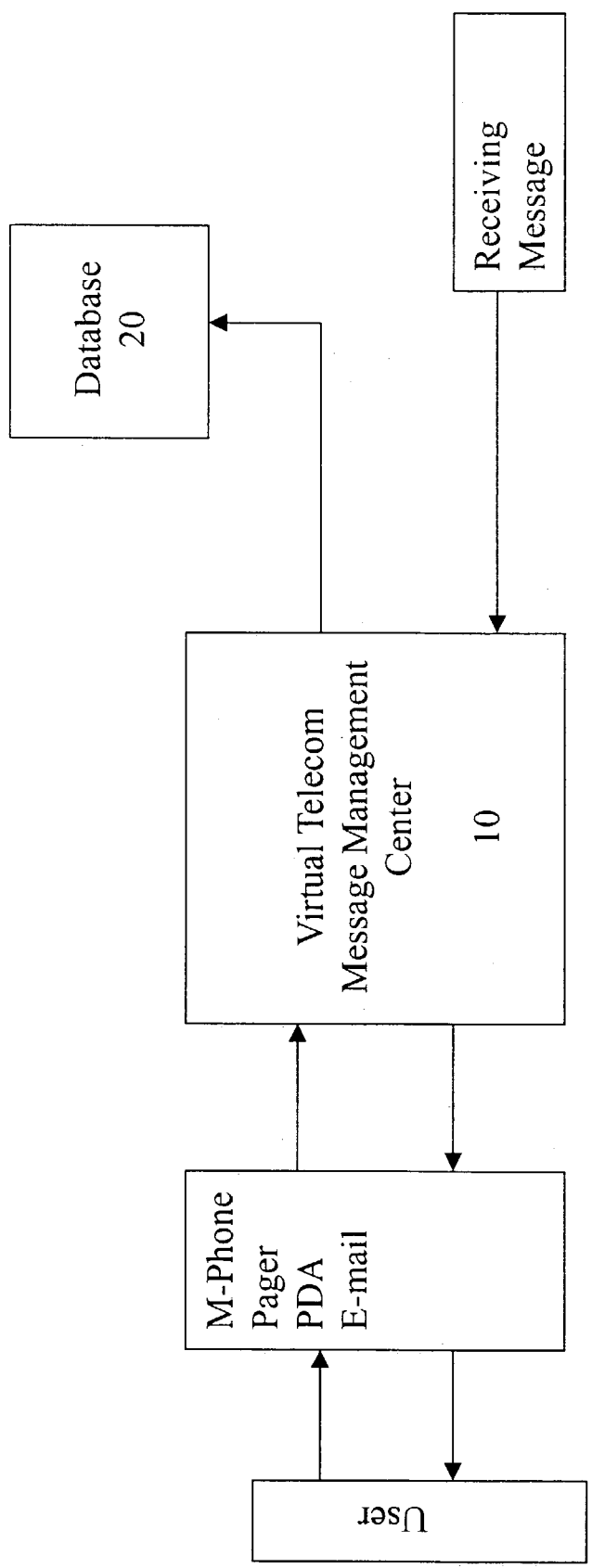
FIG. 1 is a schematic block diagram of the system in accordance with the present invention.

Referring to FIG. 1, this invention relates to a virtual telecommunication messaging service system, comprising a virtual telecommunication message management center 10 and a database 20.

The virtual telecommunication messaging service system may set a website for communication with users. Now the present invention will be described by using mobile telephone as an example. A mobile telephones user (receiver) accesses this website on Internet, and fills in required data to apply for one or more virtual numbers. The user inputs communication number (e.g. mobile telephone number) and sets message transmission password and acceptance time as required. The virtual number is generated by the virtual telecommunication message management Center 10 in correspondence to the user's application. The system sets an independent management account for each user. The user's virtual number, mobile phone number, message acceptance condition and basic data are stored into database 20. This invention configures message transmission and acceptance by users and offers all related functions.

It is noted that although we take mobile phone number as an example, the present invention is also applicable to other communication means, such as pagers, PDA or Emails.

When accepting applications, the system of the present invention may request users to provide personal data, such as age, income, place of residence and hobbies, to establish statistical data. This data is corresponding to virtual numbers of users, and users have no need of disclosing their real names or ID numbers, thus their privacy is kept secret.

Figure 2:
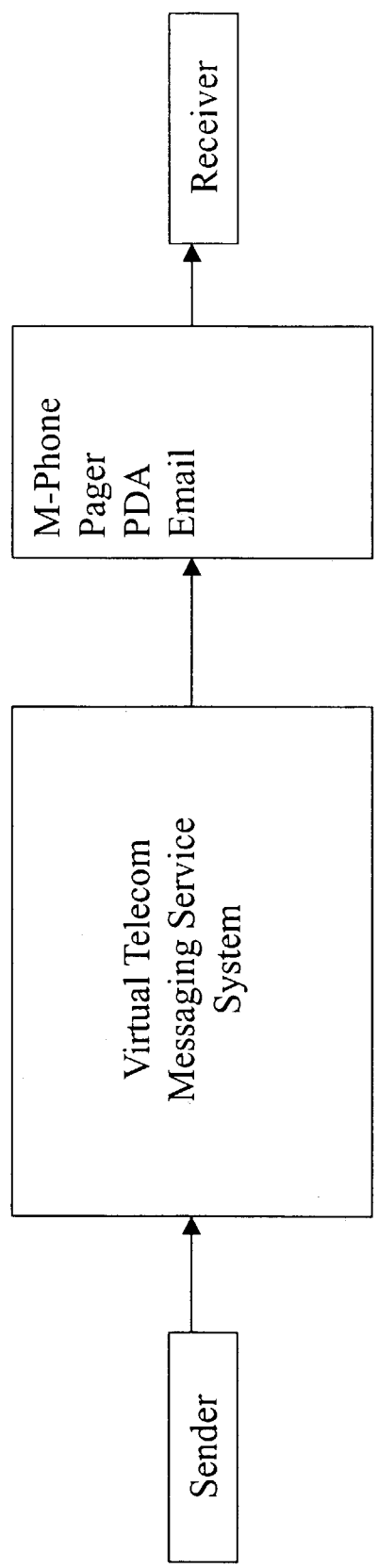
FIG. 2 is a schematic block diagram showing the transmission of message through the system in accordance with the present invention.

The user (receiver) can publicize his/her virtual numbers instead of mobile phone number. When one wants to contact the user, he/she can access the website of this system first (through Internet or WAP or paging station), inputs the virtual number, information, password (if any), and way of contact (not a requirement, for instance, mobile phone number), and the virtual telecommunication message management center 10 of the system will notify the user via short message service (SMS) of mobile telecommunication, for example, referring to FIG. 2. It is noted that ESMS, MMS or any other message service can also be used.

The messages shall be transmitted repeatedly within the set time interval of telecom operators (usually 24–48 hours) until being received by receivers. The acceptance status of message is displayed on the website. The message sender can check the transmission later to confirm that the message is received. It there is the user's Email address available, this system can periodically sort all messages and send them to the user via Email for backup.

There are no restrictive conditions for generation of virtual numbers, and this system may follow telecommunication encoding rules of ITU to generate virtual number, so that this system can be integrated with telecom system directly through SS7 or other protocols later. This system can be also combined with current LDAP directory service system, or integrated with domicile or certification system to offer diversified services.

The virtual number of a user is independent of his mobile telephone number, and the user has no need of assuming extra expenses in order to get different numbers for various uses. If the user changes his/her mobile phone number, the user only needs to update the mobile phone number on website, and others can still contact the user with the virtual number. A receiver could use the same virtual number permanently. In addition, the user can set different memos on this system or subscribe messages from the system, the subscribed messages are sent to the user at a predetermined time.

The above way can further lead to the concept of virtual groups. Mobile telephone numbers, virtual numbers and other numbers can be integrated for centralized management, wherein the message transmission to virtual numbers is still restricted by the setting of users. A sender may send messages to this group at one time, the system records it and provide message transfer result to the sender. The transfer of critical information is ensured through combination of this system and Email. For instance, news media administration could apply for virtual numbers corresponding to mobile phone numbers of news reporters of different routes (for politics, recreation and so on), and publicizes the virtual numbers as a contact way. It can be set that Email duplicate of any message forwarded to a reporter is sent to the reporter's agent, director or company management Email boxes. If reporters are changed, the media contact list will not be influenced, and what is required to do is just to update the mobile phone numbers represented by virtual numbers. The message sending units save cost of contact and media list maintenance for they can notice all media units at one time. Media units may also decide whether to process the received information or not in accordance with the significance of the received messages. Of course, news media units may also establish virtual numbers at different levels for information sources of different importance to avoid that first-hand information report is missed.

In the present invention, the system can also provide a virtual number for a user to use for certain times within a certain period. The virtual number is input into the server to be verified (not shown). The server notifies the user the verification password through this system, and the user inputs the verification password into the server to be certified to complete the procedures of certification. In this way, data of users is protected, and the objective of ID certification is achieved. If disputes or legal disputes occur, the mobile phone number represented by the virtual number can be traced back and the user can be found. The system of the present invention requests the user to feed back verification password within preset time after receiving it (5 minutes for example). In addition, the verification password can be a use-once password. Furthermore it can be set that the receiver pays the fee for the message sent by the message sender.

According to the setting of users, the message sender is requested to input password, thus the service is only offered to specific senders. In addition, the time for message acceptance can be predetermined through the system.

This system can be connected with LDAP (Lightweight Directory Access Protocol) system and publicize virtual numbers and statistical data in directory service system. Furthermore, users can conduct encrypted information transfer or certification through combination of the system with SIMM Card or other recording technologies.

As mentioned before, users may be demanded to fill in basic data upon application, such as age, sex, income and hobby, which are stored in database 20. Based on individual data in database 20, statistical data or scrolls, which are offered to businessmen with charge, can be established, and businessmen may replace questionnaire surveys with this statistical data to design effective sales promotion plans. Short messages advertisements can be sent to specific groups according to the scrolls and statistical data provided by this system in order to reduce the cost of propaganda and sales promotion greatly. Only the virtual numbers and corresponding data are provided in the statistical data or scroll. The users's true names and mobile phone numbers are not disclosed, and thus the users's privacy is protected.

For instance, company A may get scrolls and statistical data of users in this system under the user's approval and promote sales to the users through short messages. Company A issues a serial number to each user, which is corresponding to the virtual number of each user. When a user purchases goods, company A inputs the user's serial number, data, content of purchase and site of purchase and the like into the casher system. The information is then put into a database of company A. Company A integrates the data in its database with statistical data gained from the system of the present invention to analyze purchase behavior, for example getting to know the age distribution of purchase groups, thus to make future marketing more efficient.

Besides goods marketing, the statistical data or scrolls could be used for activities with anonymity, such as secret ballot, public opinion poll, making friends, matching and job application.

While an embodiment of the present invention is illustrated and described, various modifications and improvements can be made by persons skilled in this art. The embodiment of the present invention is therefore described in an illustrative but not restrictive sense. It is intended that the present invention may not be limited to the particular forms as illustrated, and that all modifications which maintain the spirit and realm of the present invention are within the scope as defined in the appended claims.

What is claimed is:

1. A virtual telecommunication messaging service system, comprising a virtual telecommunication message management center for generating a virtual number when a user submits an application by inputting basic data including at least the user's call number, wherein when a message sent to the virtual number is received, the center forwards the message to the user.

2. The system according to claim 1, wherein the call number is one of the user's mobile phone number, pager number, email address and other communication numbers.

3. The system according to claim 1, further comprising a database for storing the virtual number and corresponding basic data input by the user.

4. The system according to claim 3, wherein the basic data contains personal data of users, including set, age, place of residence and income.

5. The system according to claim 1, wherein when the virtual telecommunication message management center receives the message sent to the virtual number, the center forwards said message to the user represented by said virtual number via a short message.

6. The system according to claim 1, wherein when the virtual telecommunication message management center receives the message sent to the virtual number, the center forwards said message to the user represented by said virtual number via email.

7. The system according to claim 1, wherein when the virtual telecommunication message management center receives the message sent to the virtual number forwards said message to the user represented by said virtual number via a paging service.

8. The system according to claim 1, wherein the user sets a password for the virtual number in the virtual telecommunication message management center, and the message is allowed to be sent to the virtual number only if the password is input.

9. The system according to claim 1, wherein the user can set the time of acceptance for messages.

10. A virtual telecommunication messaging service method, comprising steps of:
   accepting basic data input by a user;
   generating a virtual number corresponding to the basic data;
   requiring the user to input at least a call number;
   providing the virtual number to the user; and
   when a message sent to the virtual numbers is received, forwarding the message to the user represented by said virtual number via the call number.

11. The method according to claim 10, wherein the call number is one of the user's mobile phone number, pager number, email address and other communication numbers.

12. The method according to claim 10, wherein the message is forwarded to the user represented by the virtual number through short messages via said call number.

13. The method according to claim 10, wherein generated virtual number and the corresponding basic data are stored in a database.

14. The method according to claim 12, wherein the basic data contains the user's personal data including at least one of sex, age, place of residence and income.

15. The method according to claim 13, wherein data in said database is arranged to establish statistical data.

16. The method according to claim 13, wherein data in said database is sorted to be a virtual number list.

17. The method according to claim 10, wherein when the message sent to virtual numbers is received, the message is forwarded to the user represented by the virtual number via a short message.

18. The method according to claim 10, wherein when the message sent to virtual numbers is received, the message is forwarded to the user represented by said virtual number via email.

19. The method according to claim 10, wherein when the message sent to virtual numbers is received, the message is forwarded to the user represented by said virtual number via a paging service.

20. A method for establishing transaction statistical data, comprising steps of:
   obtaining approval from users of a virtual telecommunication messaging service system;
   obtaining the users' virtual numbers and corresponding data from the system;
   assigning serial numbers to the users represented by the virtual numbers in the system;
   recording serial numbers and contents of exchange during transactions done by the users; and
   picking desired portions from the data corresponding to the serial numbers, and integrating the picked portions of data with the recorded contents of exchanges, thereby establishing transaction statistical data.

* * * * *